LOUDSPEAKING INTERCOMMUNICATION SYSTEMS

Filed March 22, 1962 2 Sheets-Sheet 1

Inventors
G. BESZEDICS
R. KONECNY
By
Paul Hemminger
Attorney

LOUDSPEAKING INTERCOMMUNICATION SYSTEMS

*Inventors*
G. BESZEDICS
R. KONECNY
*By* [signature]
*Attorney*

United States Patent Office 3,215,780

Patented Nov. 2, 1965

3,215,780

LOUDSPEAKING INTERCOMMUNICATION SYSTEMS

Geza Beszedics and Robert Konecny, both of Vienna, Austria, assignors to International Standard Electric Corporation, New York, N.Y., a corporation of Delaware Filed Mar. 22, 1962, Ser. No. 181,542
Claims priority, application Austria, Mar. 23, 1961, A 2,405/61
6 Claims. (Cl. 179—1)

The invention relates to telephonic systems, and more particularly to systems including loudspeaking devices.

Intercom systems are known in which the audio signals of a talking subscriber cause the lowering of the attenation of the outgoing and an increase of the attenuation of the incoming voice channel. However, such intercom systems have the disadvantage that the intensity of this attenuation of individual voice lines depends always on the intensity of the voice current controlling them and that, therefore, lower microphone levels entail lower speaker levels.

Further to this intercom systems are known in which part or the entire transmitted frequency band is rectified and used to control the connecting relay groups. The disadvantage consists in the fact that subscriber has to wait until the relays have switched through. Besides this, amplifiers are necessary in order to get a high enough output for activating the relays.

Finally, intercom systems are already known in which the amplified and rectified microphone currents influence modulators in the voice channel. Here, the signals must be filtered. Because of this, higher time constants are required for disconnecting and connecting the voice channels.

A principal object of this invention is to provide new and unique loudspeaking telephone systems.

A further object of this invention is to provide loudspeaking intercom systems that are independent of the intensity of voice currents transmitted through such systems.

Yet another object is to provide loudspeaking intercom systems having unique oscillatory circuits.

A circuit arrangement according to the invention is characterized in that a telecommunication sending device, such as a microphone, and a telecommunication receiving device, such as a speaker, are arranged in each station of the telecommunication line. An oscillator is provided for each communication line. The frequency of the oscillator may be within the frequency band of the telecommunication transmission but is, preferably below it. A switching device is operated by this oscillator at the mentioned frequency and is alternatingly switched over between the microphone of one station with the loudspeaker of the other station and vice versa. A rectifier stage has its input connected to both loudspeakers. The output of the rectifier stage yields different voltages (e.g. direct current voltages of a certain polarity), depending on the existence of a voltage of a certain amplitude at one of the loudspeakers and also depending on the position of the loudspeaker. The different voltages operate the oscillating switch in the channel for the duration of the existence of this voltage in the channel. An amplifier arrangement is also connected in the channel.

According to one embodiment of the invention, the amplifier device is connected between the part of the switching arrangement which alternatingly connects and disconnects the microphones and the part of the switching arrangement which connects and disconnects the loudspeakers. Or the amplifier may be connected in the channel between the microphone and that part of the switching arrangement which alternatingly connects and disconnects the microphones.

Finally, according to a still further embodiment of the invention, rectifiers are connected in series to increase the signal to noise ratio.

The above mentioned and other objects and features of the invention will become apparent and the invention will be best understood when the specification is read in conjunction with the accompanying drawings comprising FIGURES 1–3 in which.

Figure 1:
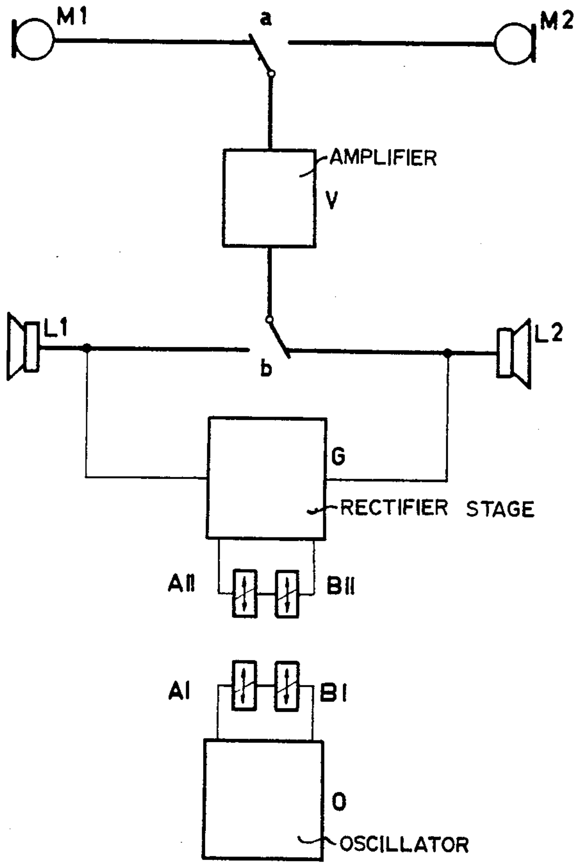
FIG. 1 shows a block diagram of the basic circuit arrangement according to the invention.

FIG. 1 shows an already completed connection between two stations. The switches for establishing the circuit, e.g. line keys, are not shown. The first station has a microphone M1 and a loudspeaker L1. The second station has a microphone M2 and a loudspeaker L2.

The circuit arrangement according to a preferred embodiment of the invention comprises a change-over switch *a* and a change-over switch *b*. Broadly, the switches *a*, *b* symbolically represent any well known switching devices such as electronic or electro-mechanical switching devices including relays, transistors or the like. An amplifier V is connected between the armatures of these switches. An oscillating device O has a frequency preferably below the range of the transmitting frequency. Devices controlled by the oscillator O cause an oscillation of the contacts *a* and *b*. In the particular example shown, a telegraph-type relay is used. The windings A1 and B1 of the telegraph-type relay actuate the contacts *a* and *b* in such a way that they oscillate essentially at the oscillator frequency.

Figures 2, 3:
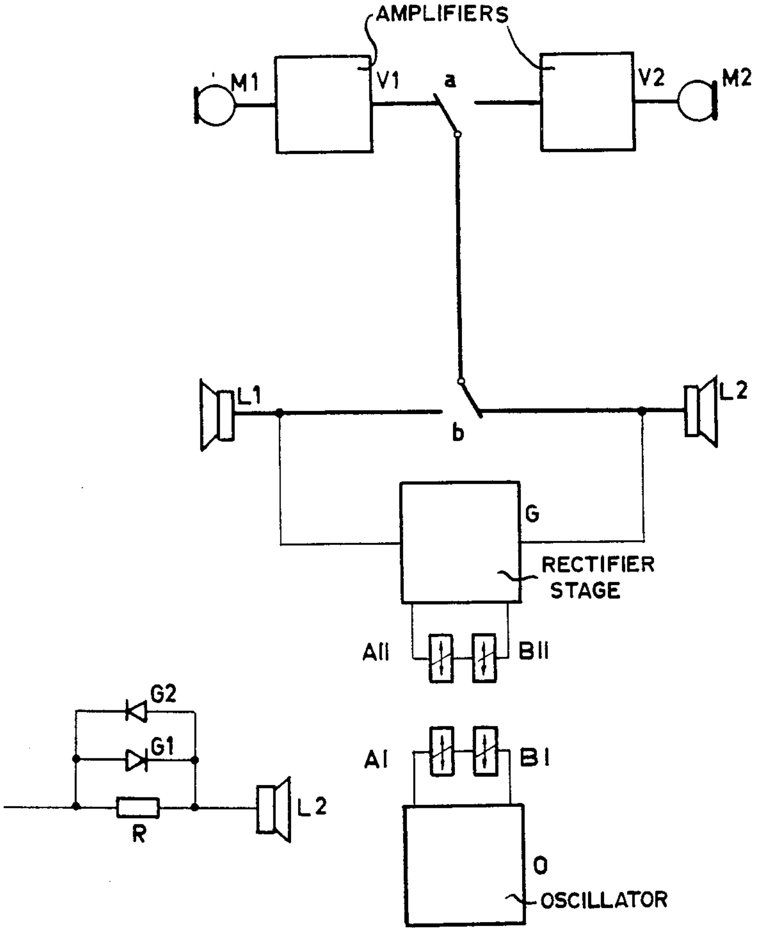
FIG. 2 shows a variation regarding the provision of the amplifier arrangement.
FIG. 3 shows a circuit arrangement for increasing the signal to noise ratio of the current.

It should be mentioned that the connections of FIG. 1 and FIG. 2 are shown with one line only for reasons of simplification. For the practical execution the return line is necessary.

The oscillation of the contacts *a* and *b* sequentially establish the following alternative circuits;

(1) Microphone M1, contact *a*, amplifier V, contact *b*, and loudspeaker L2 (with contacts *a* and *b* in the positions shown).

(2) Microphone M2, contact *a*, amplifier V, contact *b*, and loudspeaker L1 (with the contacts *a* and *b* operated from the positions shown).

As long as neither of the microphones M1 and M2 are activated, no voltage exists at the input of either loudspeaker. However, as soon as the microphone M1 (for example) is activated, (e.g. by voice) A.C. voltage occurs at the input of the loudspeaker L2 when the contacts *a* and *b* are in the position shown. This voltage is utilized, according to the invention, in order to keep the contacts *a* and *b* in the position shown. The rectifier arrangement G rectifies the voice A.C. voltage of the loudspeaker L2 and feeds it as a D.C. voltage to the relay windings AII or BII dependent on the location of the loudspeaker L2. Depending upon whether the A.C. voltage comes from the loudspeaker L1 or L2, D.C. voltage of different polarities cause currents to flow through the relay windings AII and BII in different directions whereby the polarity is chosen so that the contacts remain in a position which completes a circuit where there is voltage on the associated loudspeaker.

In the example shown, the channel of telecommunication (microphone M1, contact *a*, amplifier V, contact *b*, loudspeaker L2) is maintained as long as the microphone remains activated. During this period, the oscillator O may be disconnected by means of electronic or electromechanical devices. In a preferred example, however, the oscillator remains connected as it does not interfere.

When the microphone M1 is not activated, no voltage appears across the relay windings AII and BII. Therefore, the contacts *a* and *b* will not remain in the activated position but will oscillate under control of the oscillator O and its relay windings AI and BI.

Therefore, the microphone of either station can be connected to the loudspeaker of the other station immediately and automatically. While connected, the other channel is prevented from being switched-in during a maximal time of half of a period of the vibration of the oscillator O.

There are two reasons for preferring a frequency of oscillation below the transmission frequency band—in this example the range of voice frequencies. They are: (1) avoiding interferences caused by the oscillator frequency within the voice range, and (2) insuring a certain threshold voltage at the input of the loudspeaker concerned, in order to activate the rectifier device G.

According to the invention, the intercom system is a loudspeaking intercom system with alternate operation. However, the system behaves as an intercom system with simultaneous operation because the oscillating contacts cause the change-over of the channels within shortest time.

A circuit arrangement that is controlled by the voice level must have a certain threshold value. Therefore, initial parts of a first word or part of a sentence which do not rise to this voice level may not be transmitted. However, by using the oscillating contacts all parts of the voice signal are transmitted. This transmission is somewhat similar to quantization since shortly before the definite change-over of the otherwise oscillating contact, the voice channel closes in each half period of oscillation. Thus, the intercom system still further approaches in operation an intercom system with simultaneous operation.

FIG. 2 differs from FIG. 1 in the circuit arrangement of the amplifier device only. Here the amplifier device V is divided into two parts. An amplifier device V1 immediately follows microphone M2. This embodiment of the invention has the advantage that shielding and screening requirements are reduced as are troubles and faults. This makes a less expensive construction. However, from the point of view of switching techniques, only one amplifier is used in each established connection.

It is also possible to combine FIG. 1 and FIG. 2 with respect to the amplifier devices. That is, the amplifier parts may be arranged in a series arm (as shown in FIG. 1) as well as in a shunt arm (as shown in FIG. 2). Finally, it is also possible to omit the amplifier if the outputs of the microphones and the sensitivity of the loudspeakers are sufficiently high.

An additional circuit detail is shown in FIG. 3 which is connected to the input of the loudspeakers. This FIG. 3 example shows the circuit arrangement for loudspeaker L2 only; a similar arrangement is also provided for loudspeaker L1. An adjustable resistance R determines the operating points of the rectifiers G1 and G2 connected in anti-parallel.

Interference voltage may get into the telecommunication channels via the oscillator or via the changing-over contacts respectively. Thus, it may become important to increase the signal-to-noise ratio. The difference between the interference voltage and the signal voltage is used to reduce the influence of the interference voltage. The circuit arrangement shown in FIG. 3 serves this purpose.

The relay windings are not restricted to the series connection. They may be also connected in parallel. Further to this direct but also indirect operation of the relay windings or control devices respectively for the switching is possible. It is not always necessary to use the total voltage at the telecommunication receiving device for the control of channel direction. Also part of this voltage may be used.

The application of the invention with intercom systems with simultaneous operation has the advantage over the known systems in that a switch-over from listening to speaking takes place practically unnoticed and extremely quickly, so that one will get the impression of an intercom system with simultaneous operation.

The most important advantage of the invention, as compared with known intercom systems, results from an exclusion of feedback and subsequent system oscillation.

While the principles of the invention have been described above in connection with specific apparatus and application, it is to be understood that this description is made only by way of example and not as a limitation on the scope of the invention.

What is claimed is:

1. An intercommunication system comprising a plurality of stations, communication lines interconnecting pairs of said stations, a microphone and a loudspeaker at each of said stations, each of said lines comprising switch means for connecting the microphone of either one of said pair of stations to the loudspeaker of the other one of said pair of stations, oscillator means for generating switch control signals which recur at a frequency no greater than the communication frequency of said system, switch control means operated responsive to said generated signals for causing said switch means to alternatively connect the microphone of one of said pair of stations to the loudspeaker of the other of said pair of stations and the microphone of the other of said pair of stations to the loudspeaker of said one of said stations, rectifier means connected between said loudspeakers for rectifying input signals received at said loudpseakers, said rectified signal having a polarity indicative of the loudspeaker receiving the input signal and polarized means coupled to said loudspeakers through said rectifier means and operated responsive to the rectified input signal from any of said microphones for blocking the switch control means to prevent further operation of said switch means as long as said input signals are present at said microphone.

2. The system of claim 1 wherein said switch means comprise electronic switching devices.

3. The system of claim 1 wherein said switch means comprise electromechanical devices.

4. The system of claim 1 and amplifier means interposed in a series circuit extending via said switch means between said microphones and said loudspeakers.

5. The system of claim 1 and at least a pair of amplifier means, one of each of said pair of amplifier means connected between the individual ones of said microphones and said switch means.

6. The system of claim 1 and means for increasing the signal-to-noise ratio of said system comprising a pair of parallel connected rectifier devices poled to conduct in opposite directions connected in series with each of said loudspeakers.

References Cited by the Examiner

UNITED STATES PATENTS

| | | | |
|---|---|---|---|
| 2,427,850 | 9/47 | Gehman | 179—1 |
| 2,702,319 | 2/55 | Ryall | 179—1 |

ROBERT H. ROSE, *Primary Examiner.*

WILLIAM C. COOPER, *Examiner.*